United States Patent [19]

Gauthier

[11] Patent Number: 4,532,941

[45] Date of Patent: Aug. 6, 1985

[54] DISCHARGE CONTROL ATTACHMENT FOR A COMBINE HARVESTER

[76] Inventor: Alfred J. Gauthier, Box 212, St. Claude, Manitoba, Canada, R0G 1Z0

[21] Appl. No.: 646,145

[22] Filed: Aug. 31, 1984

[51] Int. Cl.³ .............................................. A01F 12/40
[52] U.S. Cl. ................................... 130/27 R; 241/243; 56/192
[58] Field of Search .................. 56/14.6, 192, DIG. 5, 56/13.3, 13.4, 12.8; 130/27 R, 27 B, 22 A; 241/186.2, 186.3, 222, 243, 238

[56] References Cited

U.S. PATENT DOCUMENTS

| | | | |
|---|---|---|---|
| 2,708,582 | 5/1955 | Adams | 241/243 |
| 2,865,416 | 12/1958 | Hetteen | 241/243 |
| 3,256,026 | 6/1966 | Elofson | 241/222 |

FOREIGN PATENT DOCUMENTS 2815936  10/1979  Fed. Rep. of Germany .... 130/27 R

Primary Examiner—Gene Mancene
Assistant Examiner—John G. Weiss
Attorney, Agent, or Firm—Stanley G. Ade

[57] ABSTRACT

An attachment for a combine comprising a base plate and two side plates together with mounting brackets whereby the assembly can be attached to the straw chopper and discharge of a combine with the plate inclined to the ground so that straw from the chopping cylinder engages the under surface of the plate and is directed downwardly and inwardly by the side plates to form a dense firmly packed swath.

16 Claims, 4 Drawing Figures

DISCHARGE CONTROL ATTACHMENT FOR A COMBINE HARVESTER

BACKGROUND OF THE INVENTION

This invention relates to a discharge control attachment for a combine harvester and particularly to an attachment for a combine having a straw chopping device incorporating guide fins.

In recent years it has become more and more common for combine harvesters to be fitted with a straw chopping device of the type comprising a rotary bladed drum which rotates about a horizontal axis. The drum grasps the straw as it is ejected from the rear of the combine, chops it into finer pieces and discharges it rearwardly of the combine for spreading across the field. In addition, a set of fins is mounted on the rear of the combine for directing the material outwardly and downwardly so that it is spread fairly widely across the field to avoid material collecting at particular points which can interfere with planing and growth of a subsequent crop. Such an apparatus can be removed from the combine in many cases but it is difficult to do so and a lengthy process.

Flax is a crop which has particular problems in relation to the straw. Often this straw is merely an undesired waste and is burnt following harvesting so as to avoid it collecting and interfering with the subsequent crop. In order to carry out this burning it is often necessary to rake the field in a subsequent process thus of course incurring fuel costs and requiring further labor to carry out the extra process.

A further problem which arises with flax is that it blows very easily in the wind in view of its low density and therefore swaths of the straw are very unstable and can readily blow in the wind interfering with further harvesting of the crop. In many cases therefore when the wind reaches a certain velocity it is necessary to cease harvesting to avoid the straw interfering with the collection and intake of the crop.

SUMMARY OF THE INVENTION

It is one object of the present invention, therefore, to provide an attachment for a combine which can be used in conjunction with the straw chopper to effectively swath the straw particularly though not exclusively for use with flax.

According to one aspect of the invention, therefore, there is provided an attachment for a combine harvester having a straw discharge including a rotating straw chopper assembly for chopping the straw and forcefully discharging the straw in a generally rearward direction from the combine, the attachment comprising a plate member, means for mounting the plate member on the combine rearwardly of the chopper assembly and generally transversed thereto with an underside surface thereof at an angle to the horizontal whereby the discharged straw from the chopper assembly directly contacts the surface and is directed thereby downwardly to engage the ground under force from the chopper assembly and two side guide members each extending generally downwardly from the underside at a respective end thereof and inclined inwardly relative to the rearward direction to direct the discharge straw inwardly whereby the straw engages the ground over width less than the width of the combine to form a swath.

It is one advantage of the invention, therefore, that it can be simply and readily attached to the conventional straw chopper and can modify the operation of the straw chopper to direct the material vigorously downwardly towards the ground so that it forms very dense and firmly packed swath which prevents blowing and allows ready collection of the swath. The densely packed swath also can be readily burnt since the flame will propagate through the densly packed straw.

It is a further advantage of the invention that it can be readily attached to the combine by very simple operation and thus can prevent the spreading of straw when this is not required in a manner which is very much more simple than the procedures required to remove the straw chopper from the combine.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
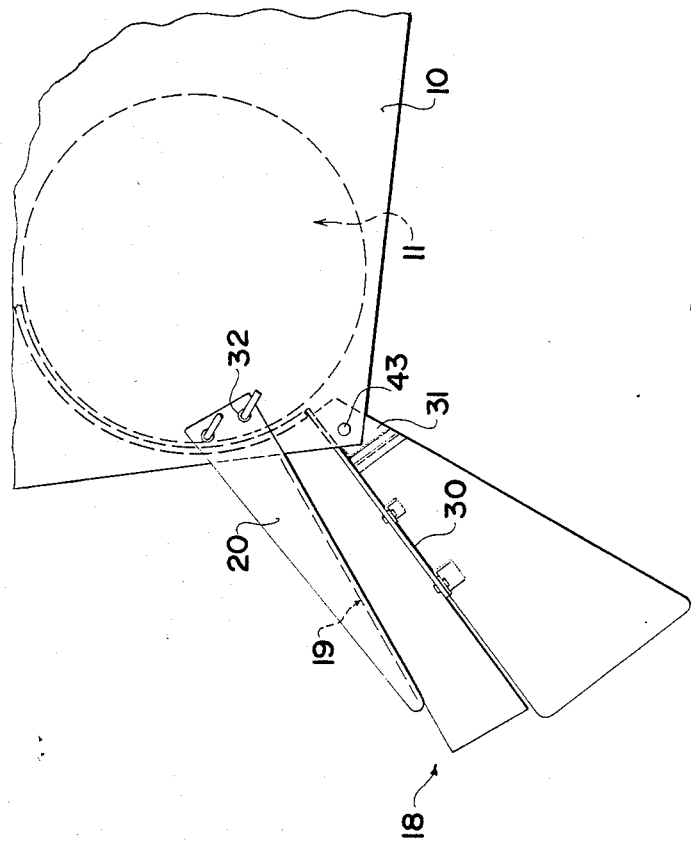
FIG. 1 is a side elevational view of the rear portion of a combine showing the attachment according to the invention mounted on the conventional straw chopper assembly of the combine.

The rear lower most corner of a combine is illustrated at 10 in FIG. 1 and the remainder of the combine is omitted from the illustration for convenience since it is well known to one skilled in the art.

Figure 2:
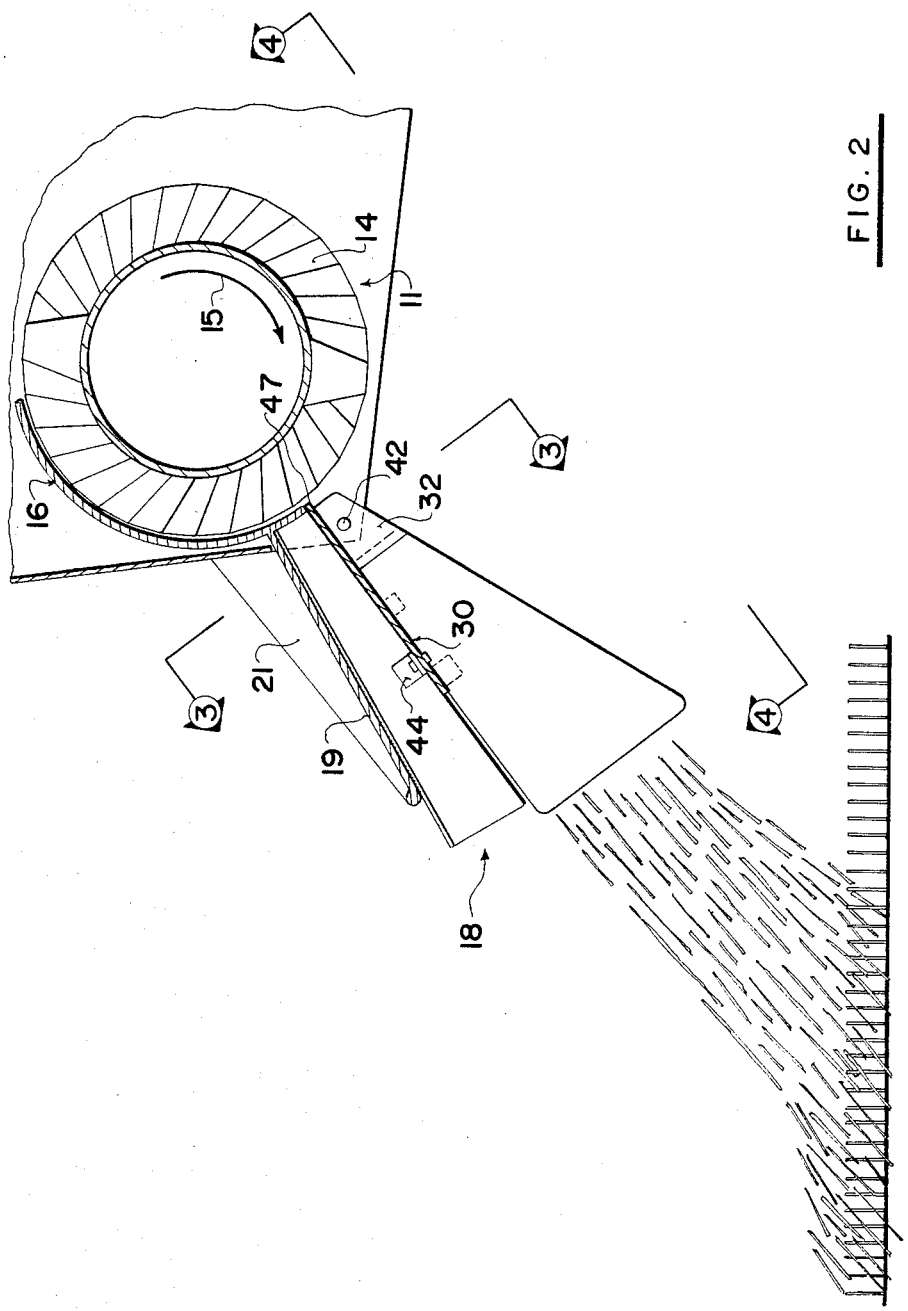
FIG. 2 is a cross-sectional view through the apparatus of FIG. 1 taken along the same direction as FIG. 1.
Figure 4:
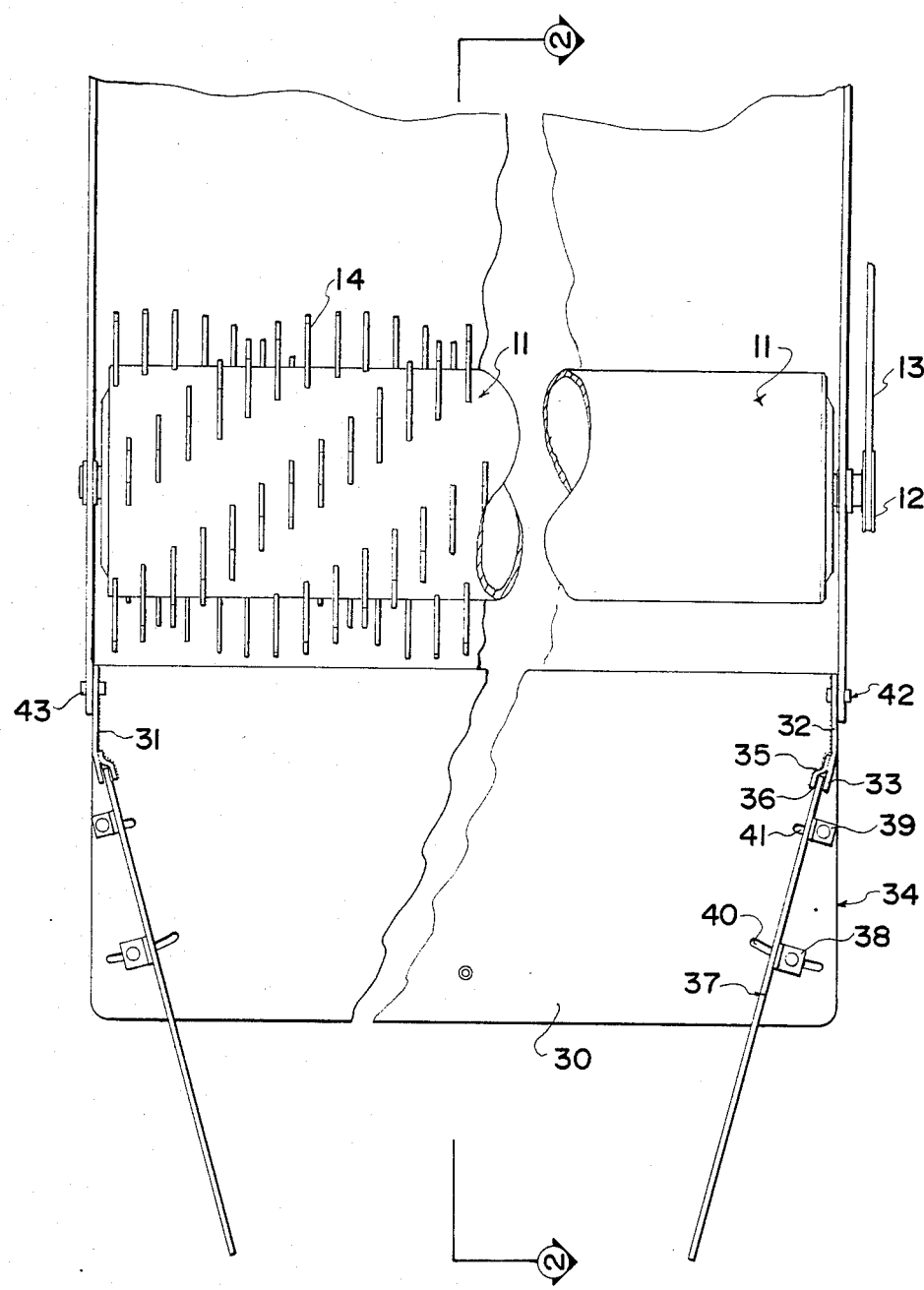
FIG. 4 is a generally underside view along the lines 44 of FIG. 2.

A straw chopper in the form of a cylindrical beater 11 is mounted in the combine as best illustrated in FIG. 4 and is driven by a pulley 12 and belt 13 from a suitable drive system on the combine. The drum 11 carries blades 14 as arranged to rotate in a clockwise direction as illustrated in FIG. 2 by the arrow 15. The blades 14 of the drum 11 are confined by a guard or guide surface 16 at the rear upper portion of the drum so the material fed at the forward upper portion of the drum is carried around by the drum and discharged downwardly and rearwardly under centrifugal force.

Figure 3:
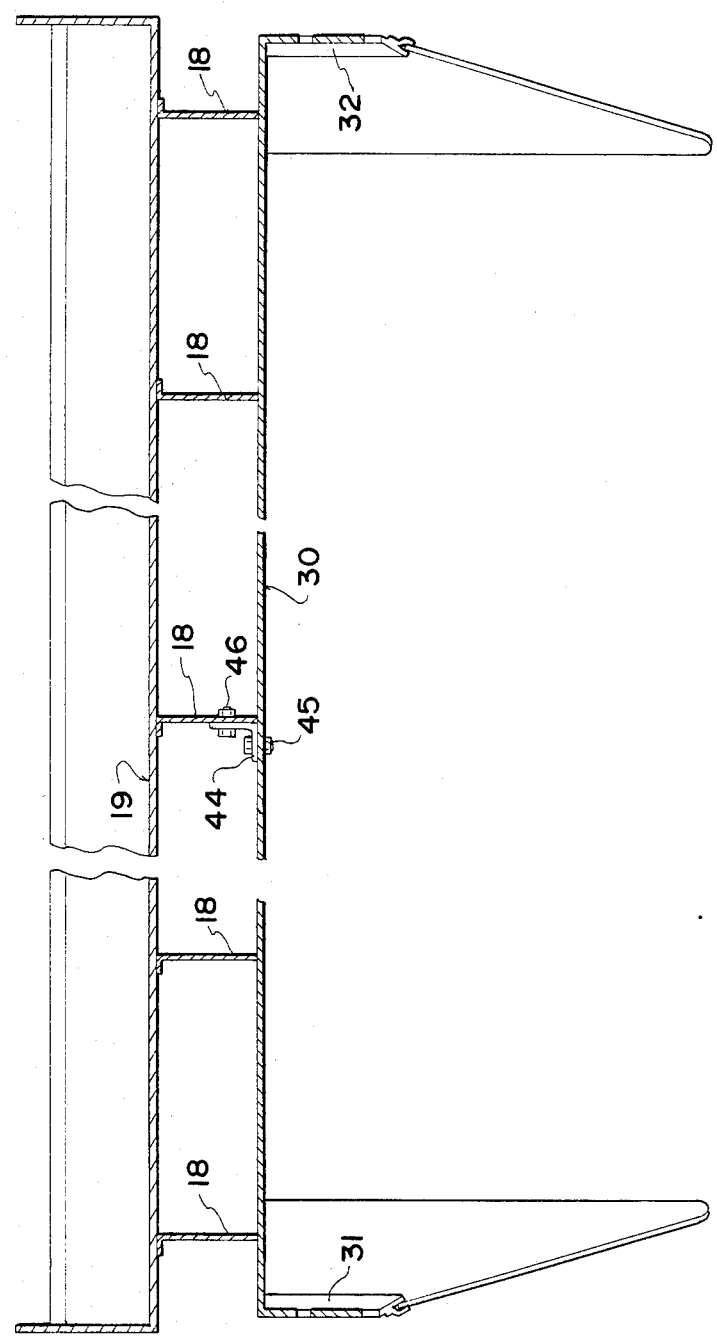
FIG. 3 is a cross-sectional view along the lines 33 of FIG. 2.

The conventional discharge arrangement for the straw chopper comprises a series of fins generally indicated at 18 which are vertical and spaced across the rear of the combine as shown in FIGS. 2, 3 and 4. The fins are attached to an upper plate 19 which acts to confine the material so that it is directed along the fins. The fins are arranged to diverge from the combine outwardly to the sides so the material is directed downwardly by the plate 19 and outwardly by the fins 18 to provide a wide high-speed spread of the material in the form of a cloud of straw which evenly spreads across the field.

The plate 19 is mounted on a pair of brackets 20 and 21 which in turn are bolted to the side of the combine by bolts 22.

The attachment according to the invention comprises a base plate 30 which is rectangular having a width the same as the width of the combine 10 and a depth of the order of 15 inches. A pair of side plates 31, 32 is arranged at the ends of the plate 30 with each side plate welded to the base plate 30 at a front edge thereof and extending along the side thereof. Each side plate includes an end portion which is curved or bent inwardly as indicated at 33 so as to incline relative to the side edge 34 of the base plate at an angle of the order of 15 degrees.

A flange portion 35 is welded to the portion 33 so as to define therebetween a slot 36 for receiving a loose side portion 37. In combination the sides 32 and 37 provide effectively a triangular baffle which commences at the front side edge of the plate 30 and inclines inwardly to a wider end of the triangle which extends beyond the rear edge of the plate 30. A pair of angle brackets 38, 39 are welded to the edge of the loose side portion 37 adjacent the plate 30 so that the angle brackets 38, 29 can be bolted through slots 40, 41 in the base plate to adjust the angle of the loose side plate relative to the base plate 30.

The attachment comprising the base plate 30 and side baffles 32/37 can be attached to the combine by bolts 42, 43 which pass through suitable openings in the side wall of the combine 10. An angle bracket 44 is bolted centrally of the plate 30 by a bolt 45 so that the upwardly extending flange of the angle bracket lies parallel to one of the fins 18 for attachment by a bolt 46. Thus the attachment comprising the base plate 30 and side plates or baffles can simply be attached to the combine by the two side bolts and by the central bolt and angle bracket 44.

The positioning of the attachment is such that the plate 30 prevents access of the straw to the fins 18. Thus a front edge of the plate 30 indicated at 47 abuts an edge of the casing 16 so that straw is ejected from the chopping cylinder 11 against the underside of the plate 30 from which it is directed vigorously downwardly into contact with the ground. The angle of the plate 30 relative to the ground is adjusted by the mounting and particularly the angle bracket 44 and also by adjusting the brackets 20 and 21. The angle of the plate 30 relative to the ground therefore should lie in the range 40° to 50° and preferably 45° so the material is directed with sufficient force toward the ground to contact the ground and form a dense and firmly packed swath. The side plates or baffles also direct the material inwardly so that the swath is of a reduced width relative to the combine and preferably of a width of the order of 2 feet. In some cases the force provided by the plate 30 in combination with the cylinder 11 is sufficient to drive the straw stalks into the ground whereby the swath is held against blowing.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. An attachment for a combine harvester of the type having a straw discharge including a straw chopper assembly rotatable about a substantially horizontal axis transverse to the combine harvester for chopping the straw and forcefully discharging the straw in a generally rearward direction from the combine harvester, and fins rearward of the chopper assembly for directing the discharged straw outwardly to the sides thereof, the attachment comprising a plate member, means arranged for mounting the plate member on the combine harvester rearwardly of the chopper assembly and generally transverse to the combine harvester with an underside surface thereof at an angle to the horizontal so as to cover the fins to prevent discharged straw from engaging said fins whereby, in use, the discharged straw from the chopper assembly directly contacts the surface and is directed thereby downwardly to engage the ground under force from the chopper assembly and two side guide members each extending generally downwardly from the underside of the plate member and arranged at respective ends of the plate adjacent the sides of the combine harvester and inclined inwardly relative to the rearward direction to direct the discharge straw inwardly whereby the straw engages the ground over a width less than the width of the combine harvester to form a swath.

2. Apparatus according to claim 1 wherein the angle of the surface relative to the horizontal is arranged to lie in the range 40 degrees to 50 degrees.

3. Apparatus according to claim 1 wherein the angle of the side guide members relative to the plate member is adjustable whereby to vary the width of the swath.

4. Apparatus according to claim 1 wherein the side guide members each include an end portion at the end of the plate for bolting to the side of the combine.

5. Apparatus according to claim 4 wherein the side guide members include a hinge whereby a portion thereof can be inclined inwardly at an adjustable angle relative to said end portion.

6. Apparatus according to claim 1 wherein the side plates are substantially triangular providing a deeper edge at the end thereof remote from the chopper assembly.

7. Apparatus according to claim 1 wherein the straw chopper assembly comprises a plurality of vertical blades rotating about a horizontal axis and wherein the edge of the plate member is arranged substantially immediately adjacent to the periphery of the straw chopper assembly.

8. Apparatus according to claim 1 wherein the plate member comprises a substantially rectangular plate having a width substantially equal to the width of the combine and a depth sufficient that all straw discharged from said chopper assembly engages the plate for guiding toward the ground, the side guide members comprising substantially triangular members having a wider end remote from said chopper assembly and wherein said mounting means comprises means on said side guide members for bolting said side guide members to sides of said combine and means for bolting an edge of said plate remote from said chopper assembly to said combine substantially centrally thereof.

9. A combine harvester comprising a straw discharge assembly including a straw chopper assembly rotatable about a substantially horizontal axis transverse to the combine harvester for chopping the straw and forcefully discharging the straw in a generally rearward direction from the combine harvester, a plurality of fins rearward of the chopper assembly for directing the discharged straw outwardly to the side thereof and a discharge guide attachment comprising a plate member, means mounting the plate member on the combine harvester rearwardly of the chopper assembly and generally transverse to the combine harvester with an underside surface thereof at an angle to the horizontal so as to cover the fins to prevent discharged straw from engaging said fins whereby, in use, the discharge straw from the chopper assembly directly contacts the surface and is directed thereby downwardly to engage the ground under force from the chopper assembly and two side guide members each extending generally downwardly from the underside of the plate member and arranged at respective ends of the plate adjacent the sides of the combine harvester and inclined inwardly relative to the rearward direction to direct the discharge straw inwardly whereby the straw engages the ground over a width less than the width of the combine harvester to form a swath.

10. Apparatus according to claim 9 wherein the angle of the surface relative to the horizontal is arranged to lie on the range 40 degrees to 50 degrees.

11. Apparatus according to claim 9 wherein the angle of the side guide members relative to the plate member is adjustable whereby to vary the width of the swath.

12. Apparatus according to claim 9 wherein the side guide members each include a portion at the end of the plate for bolting to the side of the combine.

13. Apparatus according to claim 12 wherein the side guide members include a hinge whereby a portion thereof can be inclined inwardly at an adjustable angle relative to said end portion.

14. Apparatus according to claim 9 wherein the side plates are substantially triangular providing a deeper edge at the end thereof remote from the chopper assembly.

15. Apparatus according to claim 9 wherein the straw chopper assembly comprises a plurality of vertical blades rotating about a horizontal axis and wherein the edge of the plate member is arranged substantially immediately adjacent to the periphery of the straw chopper assembly.

16. Apparatus according to claim 9 wherein the plate member comprises a substantially rectangular plate having a width substantially equal to the width of the combine and a depth sufficient that all straw discharged from said chopper assembly engages the plate for guiding toward the ground, the side guide members comprising substantially triangular members having a wider end remote from said chopper assembly and wherein said mounting means comprises means on said side guide members for bolting said side guide members to sides of said combine and means for bolting an edge of said plate remote from said chopper assembly to said combine substantially centrally thereof.

* * * * *